United States Patent
Schubert et al.

(10) Patent No.: US 6,714,848 B2
(45) Date of Patent: Mar. 30, 2004

(54) ADAPTIVE ROLLOVER DETECTION APPARATUS AND METHOD

(75) Inventors: Peter J. Schubert, Carmel, IN (US); Edward J Wallner, Kokomo, IN (US); David J. Nichols, Carmel, IN (US); Jan K. Schiffmann, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/319,325

(22) Filed: Dec. 13, 2002

(65) Prior Publication Data

US 2003/0093201 A1 May 15, 2003

Related U.S. Application Data

(63) Continuation of application No. 10/005,990, filed on Nov. 8, 2001, now Pat. No. 6,522,963, and a continuation-in-part of application No. 09/725,645, filed on Nov. 29, 2000, now Pat. No. 6,542,792.

(51) Int. Cl.[7] .................... B60R 22/00; G05D 1/00; G06F 17/00; G06F 7/00; G06F 19/00
(52) U.S. Cl. .................... 701/46; 701/47; 280/735; 73/504.03
(58) Field of Search ................ 701/1, 45, 46, 701/36, 110, 38, 70; 180/272, 271, 282, 252; 280/735, 756; 340/440, 438; 702/151; 73/504.03, 492, 865.9; 172/45; 600/19

(56) References Cited

U.S. PATENT DOCUMENTS

| 5,610,575 | A | 3/1997 | Gloutsos | 340/429 |
| 5,684,456 | A | 11/1997 | Walter | 340/440 |

(List continued on next page.)

FOREIGN PATENT DOCUMENTS

| DE | 19606043 | 8/1997 |
| DE | 19609176 | 9/1997 |
| DE | 19609717 | 9/1997 |
| DE | 19828338 | 12/1999 |
| EP | 0306003 | 3/1989 |
| EP | 0430813 | 6/1991 |
| EP | 1157898 | 11/2001 |
| EP | 1157899 | 11/2001 |
| EP | 1211144 | 6/2002 |
| GB | 2335521 | 9/1999 |

OTHER PUBLICATIONS

Mike Horton, Charles Kitchin, "A Dual–Axis Tilt Sensor Based on Micromachined Accelerometers," Sensors, Apr. 1996, pp. 91–94.

Steiner, Weidel, Kublbeck, Steurer, Hora, "Roll Over Detection" SAE Technical Paper Series, Feb. 24–27, 1997, pp. 45–49.

(List continued on next page.)

Primary Examiner—Thomas G. Black
Assistant Examiner—Ronnie Mancho
(74) Attorney, Agent, or Firm—Robert M. Sigler; Stefan V. Chmielewski

(57) ABSTRACT

A vehicle rollover detection apparatus and method are provided for detecting an overturn condition of the vehicle. The rollover detection apparatus includes an angular rate sensor sensing angular rate of the vehicle, and a vertical accelerometer for sensing vertical acceleration of the vehicle. A controller processes the sensed angular rate signal and integrates it to produce an attitude angle. The vertical acceleration signal is processed to determine an inclination angle of the vehicle. The rollover detection apparatus adjusts the attitude angle as a function of the inclination angle and compares the adjusted attitude angle and the processed angular rate signal to a threshold level to provide a vehicle overturn condition output signal. Additionally, the rollover detection apparatus detects a near-rollover event and adjusts the variable threshold in response thereto to prevent deployment of a vehicle overturn condition, thus providing immunity to such events.

19 Claims, 11 Drawing Sheets

U.S. PATENT DOCUMENTS

| | | | |
|---|---|---|---|
| 5,809,437 A | 9/1998 | Breed | 701/29 |
| 5,825,284 A | 10/1998 | Dunwoody et al. | 340/440 |
| 5,835,873 A | 11/1998 | Darby et al. | 701/45 |
| 5,890,084 A | 3/1999 | Halasz et al. | 701/45 |
| 6,002,974 A * | 12/1999 | Schiffmann | 701/36 |
| 6,002,975 A * | 12/1999 | Schiffmann et al. | 701/36 |
| 6,038,495 A | 3/2000 | Schiffmann | 701/1 |
| 6,055,472 A | 4/2000 | Breunig et al. | 701/45 |
| 6,141,604 A | 10/2000 | Mattes et al. | 701/1 |
| 6,175,787 B1 | 1/2001 | Breed | 701/29 |
| 6,192,305 B1 * | 2/2001 | Schiffmann | 701/45 |
| 6,292,759 B1 * | 9/2001 | Schiffmann | 702/151 |
| 6,397,127 B1 | 5/2002 | Meyers et al. | 701/1 |
| 6,496,759 B1 | 12/2002 | Mattes et al. | 701/1 |
| 6,535,800 B2 * | 3/2003 | Wallner | 701/1 |
| 6,542,792 B2 * | 4/2003 | Schubert et al. | 701/1 |
| 6,556,908 B1 * | 4/2003 | Lu et al. | 701/38 |
| 6,584,388 B2 * | 6/2003 | Schubert et al. | 701/46 |
| 2002/0019719 A1 | 2/2002 | Kueblbeck et al. | 702/147 |
| 2002/0065591 A1 | 5/2002 | Schubert et al. | 701/38 |
| 2002/0075140 A1 * | 6/2002 | Yeh et al. | 340/438 |

OTHER PUBLICATIONS

P.E.M. Frere, "Problems of Using Accelerometers to Measure Angular Rate in Automobiles" Sensors and Actuators A. 25–27, 1991, pp. 821–824.

Neff, Natalie, Ward's Auto World, Nov. 1996, p. 74.

Massachusetts Inst. Of Tech., Kalman Filter Estimation of Underwater Vehicle Position and Attitude, Sept. 1994, p. 106.

* cited by examiner

ADAPTIVE ROLLOVER DETECTION APPARATUS AND METHOD

CROSS-REFERENCE TO RELATED APPLICATION

This application is a continuation of application Ser. No. 10/005,990, entitled "ADAPTIVE ROLLOVER DETECTION APPARATUS AND METHOD," filed on Nov. 8, 2001 now U.S. Pat. No. 6,522,963, and is a continuation-in-part of application Ser. No. 09/725,645 entitled "VEHICLE ROLLOVER DETECTION APPARATUS AND METHOD." filed on Nov. 29, 2000 and now U.S. Pat. No. 6,542,792.

TECHNICAL FIELD

The present invention generally relates to rollover sensors and, more particularly, to cost affordable vehicle rollover detection with reduced sensor hardware and enhanced rollover discrimination for sensing a rollover condition of a vehicle.

BACKGROUND OF THE INVENTION

Automotive vehicles are increasingly equipped with safety-related devices that deploy in the event that the vehicle experiences a rollover so as to provide added protection to the occupants of the vehicle. For example, upon detecting a vehicle rollover condition, a pop-up roll bar can be deployed such that, when activated, the roll bar further extends vertically outward to increase the height of support provided by the roll bar during a rollover event. Other controllable features may include deployment of one or more air bags, such as frontal air bags, side mounted air bags, and roof rail air bags, or actuating a pretensioner to pretension a restraining device, such as a seat belt or safety harness, to prevent occupants of the vehicle from ejecting from the vehicle or colliding with the roof of the vehicle during a rollover event.

In the past, mechanical-based rollover sensors have been employed in automotive vehicles to measure the angular position of the vehicle from which a rollover condition can be determined. The mechanical sensors have included the use of a pendulum normally suspended vertically downward due to the Earth's gravitational force. Many mechanical automotive sensing devices are employed simply to monitor the angular position of the vehicle relative to a horizontal level ground position. As a consequence, such mechanical automotive sensors have generally been susceptible to error when the vehicle travels around a corner or becomes airborne, in which case the Earth's gravitational force, which the sensor relies upon, may be overcome by other forces.

More sophisticated rollover sensing approaches require the use of as many as six sensors including three accelerometers and three angular rate sensors, also referred to as gyros, and a microprocessor for processing the sensed signals. The three accelerometers generally provide lateral, longitudinal, and vertical acceleration measurements of the vehicle, while the three gyros measure angular pitch rate, roll rate, and yaw rate. However, such sophisticated rollover sensing approaches generally require a large number of sensors which add to the cost and complexity of the overall system. In addition, many known sophisticated sensing systems are generally susceptible to cumulative drift errors, and therefore occasionally must be reset.

In an attempt to minimize the number of sensors required, some conventional rollover sensing approaches have employed, at a minimum, both an angular roll rate sensor and lateral accelerometer. For those sensors designed to detect both rollover and pitchover events, an angular pitch rate sensor and a longitudinal accelerometer are typically added. While the angular rate sensor can be integrated to calculate a roll angle, in practice, angular rate sensors typically generate a non-zero, time-varying output, even in the absence of a roll rate. This bias may cause a significant error in the integration generated roll angle, and such bias must be compensated in order to provide an accurate sensed measurement. Accordingly, many conventional rollover sensing approaches typically require auxiliary sensors, in addition to the angular rate sensor, to compensate for zero-input biases inherent in many angular rate sensors.

Another rollover sensing approach is disclosed in related application Ser. No. 09/725,645 entitled "VEHICLE ROLLOVER DETECTION APPARATUS AND METHOD," filed on Nov. 29, 2000, which is commonly assigned to the assignee of the present application. The aforementioned approach employs an angular rate sensor generating a sensed roll rate signal which is integrated to produce a roll angle. The roll angle and sensed roll rate signals are processed by a microprocessor-based controller to generate a rollover deployment signal. This approach also employs a bias removal device which removes bias. However, this approach may require a partial reset when the integration window is contracted, which places a large computational burden on the microprocessor. In addition, microprocessor constraints on random-access memory (RAM) limit the width of the integration window, placing an upper limit on the maximum duration of a rollover event that can be properly sensed. This generally can result in small errors in the roll angle which could have an effect on concatenated events such as two-stage cross slope rollovers. Additionally, it remains difficult to ascertain a forthcoming rollover event for certain very near-rollover events.

Accordingly, it is therefore desirable to provide for an accurate and cost affordable rollover detection apparatus and method that minimizes signal bias. It is further desirable to provide for a rollover detection apparatus and method that provides improved immunity to non-rollover conditions during near-rollover events so as to prevent false rollover deployments during these driving events.

SUMMARY OF THE INVENTION

In accordance with the teachings of the present invention, a vehicle rollover sensing apparatus and method are provided for detecting an anticipated overturn condition of a vehicle, and thus allowing for the timely deployment of safety-related devices. The rollover sensing apparatus includes an angular rate sensor for sensing attitude rate of change of a vehicle and producing an angular rate signal indicative thereof, and a vertical accelerometer for sensing vertical acceleration of the vehicle and producing a vertical acceleration signal indicative thereof. The rollover sensing apparatus also has a controller including an integrator for integrating the attitude rate signal and producing an attitude angle. The controller determines an inclination angle of the vehicle based on the vertical acceleration signal and adjusts the roll angle as a function of the determined inclination angle. The controller further includes deployment logic for comparing the adjusted attitude angle and angular rate signal to a threshold limit, and providing a vehicle overturn condition signal based on the comparison.

According to another aspect of the present invention, a rollover detection apparatus and method is provided for detecting an anticipated overturn condition for a vehicle and providing immunity to near-rollover events. The apparatus comprises an angular rate sensor for sensing attitude rate of change of a vehicle and producing an attitude rate signal indicative thereof, an integrator for integrating the sensed attitude rate of change signal and producing an attitude angle, and deployment logic. The deployment logic compares the attitude angle and sensed attitude rate signal with a variable threshold defining a region of deployment and a region of no deployment. The deployment logic further detects the presence of a driving event, such as a near-rollover event, which causes at least one of a large attitude rate and a large attitude angle, and adjusts the variable threshold based on detecting the driving event so as to prevent deployment of a vehicle overturn condition. The output provides a vehicle overturn condition signal based on the comparison.

Accordingly, the rollover sensing apparatus and method of the present invention advantageously provides enhanced rollover detection with a minimal number of sensors to detect an overturn (e.g., rollover) condition of a vehicle. It should be appreciated that the apparatus and method employs an angular rate sensor and vertical accelerometer, without requiring other auxiliary sensors, to achieve cost efficient and accurate rollover detection. It should further be appreciated that the apparatus and method provide enhanced immunity to false rollover events, such as those events that approach a near-rollover condition.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
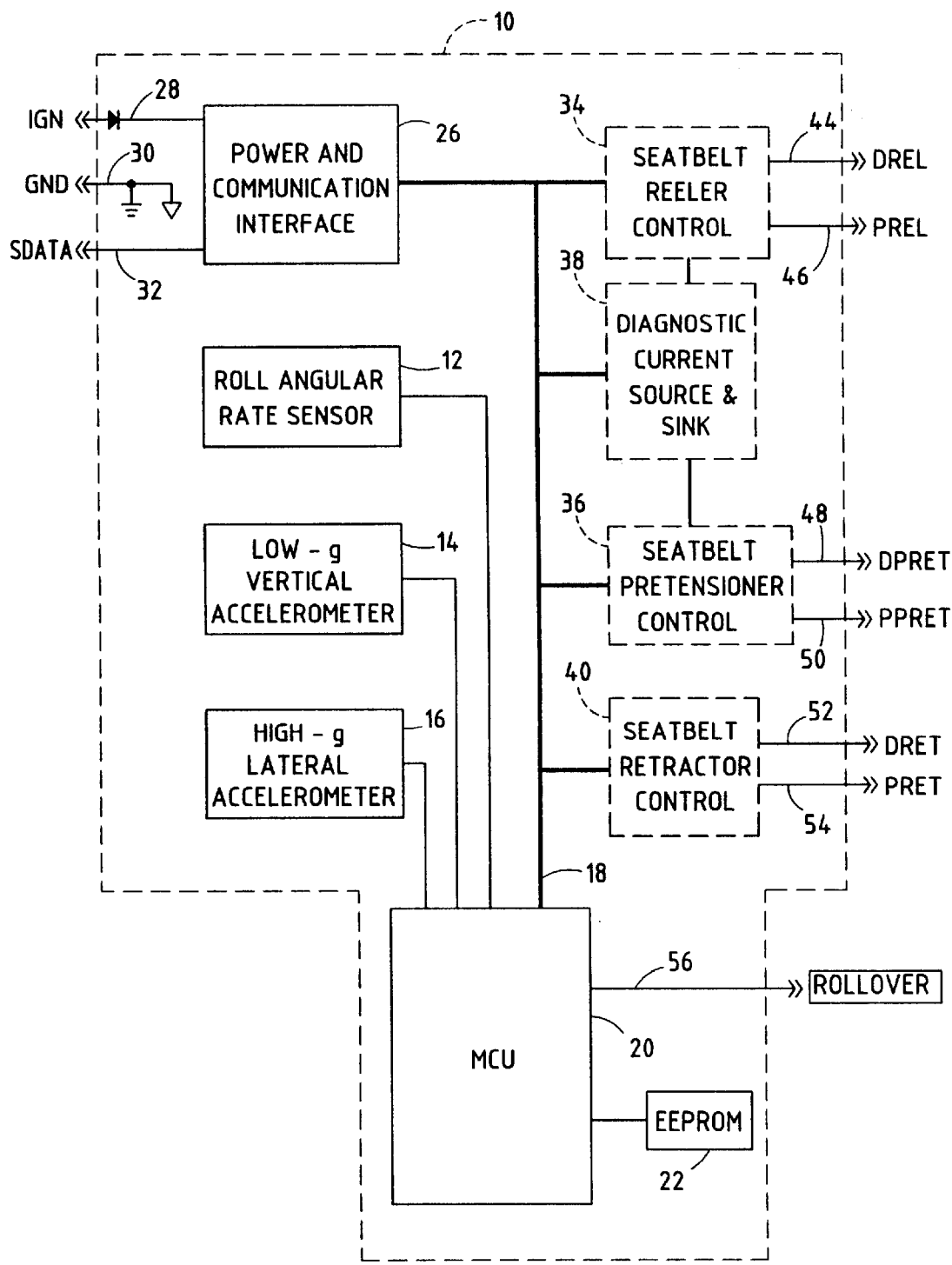
FIG. 1 is a block diagram of a rollover sensing module for detecting vehicle rollover according to the present invention.

Referring to FIG. 1, a rollover sensing module 10 is illustrated for use in sensing roll angular rate of a vehicle and detecting a rollover condition of an automotive vehicle (not shown). The rollover sensing module 10 of the present invention is preferably mounted on an automotive vehicle and is used to detect, in advance, a future rollover event (condition) of the vehicle. A vehicle rollover condition, as described herein in connection with the present invention, may include side-to-side rotation of the vehicle about the longitudinal axis of the vehicle, commonly referred to as a "vehicle rollover," or back-to-front rotation about the lateral axis of the vehicle, commonly referred to as a "vehicle pitchover," or a combination of rollover and pitchover. For purposes of describing the rollover sensing of the present invention, the term "rollover" is generally used to refer to either a rollover condition or a pitchover condition.

The rollover sensing module 10 is designed to be located in an automotive vehicle to sense vehicle dynamics and to detect a rollover condition of the vehicle. Upon detecting a vehicle rollover condition, the rollover sensing module 10 provides a rollover deployment command signal indicative of the detected rollover condition. The rollover deployment command signal may be supplied to one or more selected vehicle devices, such as safety-related devices, to deploy the device(s) in anticipation of an upcoming rollover event. The detected rollover condition output signal may be employed to deploy a pop-up roll bar to provide vertical clearance to the occupants of the vehicle as the vehicle rolls over. Similarly, the detected rollover deployment output signal may actuate an occupant restraining device, such as a seat belt or harness safety pretensioner, to eliminate slack in the restraining device just prior to the vehicle rollover event occurring. Other control functions include deployment of front, side or roof rail (side curtain) deployment air bags to protect the vehicle occupants during a vehicle rollover. These and other devices may be controlled in response to the rollover deployment output signal.

The rollover sensing module 10 includes two sensors for detecting a rollover condition and generating a rollover deployment decision, with both sensors preferably assembled together on module 10, and each sensor oriented to perform the intended sensing operation. The sensors include a roll angular rate sensor 12 and a low-g vertical accelerometer 14 for use in detecting vehicle rollover. The roll angular rate sensor 12 measures the time rate of angular roll about the longitudinal axis of the vehicle. The low-g vertical accelerometer 14 measures the vertical acceleration of the vehicle, particularly for low-g accelerations. Low-g accelerations may include minus five (−5) to plus five (+5) gs, according to one example. In addition, a high-g lateral accelerometer 16 is also shown assembled on module 10 for detecting lateral (side-to-side) acceleration of the vehicle particularly for high-g accelerations. High-g accelerations may include minus thirty-five (−35) gs to plus thirty-five (+35) gs, according to one example. The lateral acceleration signal is used as an input to an arming algorithm, which may or may not be employed for determining the rollover deployment command signal.

While the rollover detection of the present invention is described herein for determining vehicle rollover about the longitudinal axis of the vehicle, it should be appreciated that the present invention may be configured to provide pitchover detection about the lateral axis of the vehicle. In order to provide pitchover detection, a pitch angular rate sensor would be employed in place of the roll angular rate sensor 12, and the high-g lateral accelerometer would be replaced by a high-g longitudinal accelerometer to provide the input to the arming function. It should be readily apparent to those skilled in the art that pitchover detection may require different threshold values, in contrast to rollover detection. It should further be appreciated that both rollover and pitchover detection may be achieved by employing both roll and pitch angular rate sensors.

The rollover sensing module 10 further includes a microprocessor control unit (MCU) 20 for processing sensed vehicle parameters according to a rollover detection algorithm to detect vehicle rollover conditions. MCU 20 is preferably a microprocessor-based controller and, according to one example, may include Model No. 68HC08, made available by Motorola. Associated with MCU 20 is an electrically erasable programmable read-only memory (EEPROM) 22 that stores various programmed calibrations for performing the rollover detection algorithm, as is explained herein. The EEPROM 22 can be integrated with the MCU 20 or provided external thereto.

Rollover sensing module 10 also includes a power and communication interface 26 for receiving an ignition (IGN) signal on line 28 and communicating via serial data (SDATA) on serial data bus 32. Rollover sensing module 10 is further grounded via ground (GND) line 30. Power and communication interface 26 converts an approximately 12-volt DC IGN signal input to 5-volts DC for use as a power supply to the powered components on module 10. Serial data communicated on serial data bus 32 may include individual sensor outputs and processor outputs, as well as programmed inputs.

MCU 20 receives, as inputs, signals from each of angular rate sensor 12, vertical accelerometer 14, and lateral accelerometer 16. In addition, the MCU 20 may receive other various inputs which, although not required, may be employed in connection with the rollover detection and deployment of the present invention. These other inputs may include a passenger presence signal, which may be generated as a sensed output from an occupant presence sensor for purposes of sensing the presence of a passenger, and a driver's seat belt (DSB) signal and a passenger's seat belt (PSB) signal which indicate the use of driver and passenger (s) seat belts, respectively.

MCU 20 processes the various input signals, as will be explained hereinafter, and produces a rollover deployment command signal 56, which is indicative of a detected vehicle rollover condition. In addition, MCU 20 provides the detected rollover deployment command signal on line 18 to control designated onboard control devices, such as a seat belt reeler control 34, a seat belt pretensioner control 36, and a seat belt retractor control 40. Seat belt reeler control 34 controls the seat belt reeler for both the driver's side and passenger's side via respective signals DREL and PREL, as provided on output signals 44 and 46, respectively. Seat belt pretensioner control 36 likewise controls seat belt pretensioning for the driver's side and passenger's side via signals DPRET and PPRET, as provided on output lines 48 and 50, respectively. A diagnostic current source and sink 38 allows for diagnostic testing of the seat belt reeler control 34 and seat belt pretensioner control 36. The seat belt retractor control 40 controls retractor locks associated with the seat belt to both the driver's seat belt and passenger's seat belt via signals DRET and PRET, as provided on output lines 52 and 54.

Figure 2:
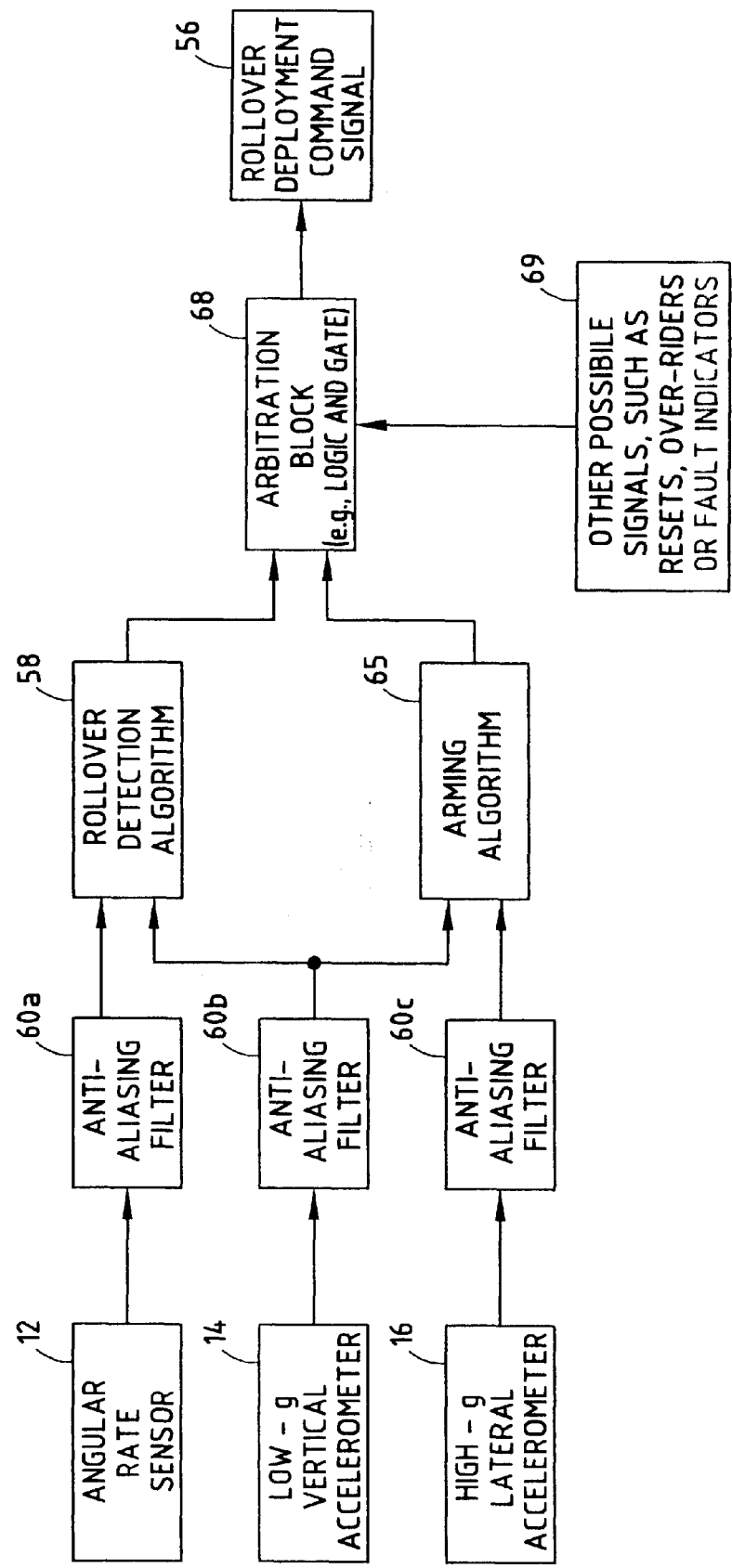
FIG. 2 is a block diagram further illustrating the rollover sensing according to the present invention.

The rollover detection apparatus of the present invention is further shown in FIG. 2. Included are anti-aliasing filters 60a–60c coupled to the output of each of angular rate sensor 12, vertical accelerometer 14, and lateral accelerometer 16, respectively. The anti-aliasing filters 60a–60c each employ a low-pass filter to remove high frequency signal content, thereby eliminating at least some corruption of the sensed signals. The rollover detection apparatus includes a rollover detection algorithm 58 for generating a rollover deployment decision as a function of the filtered angular rate signal and the vertical acceleration signal. An arming algorithm 65 is also shown receiving the vertical acceleration signal and the lateral acceleration signal. The arming algorithm serves as a redundancy check prior to deploying devices during a rollover event, as is known in the art. This may be achieved by employing an arbitration block 68, which may include a logic AND gate for logically ANDing the arming signal with the rollover deployment decision. The output of the arbitration block 68 provides the rollover deployment command signal 56. It should be appreciated that the anti-aliasing filters 60a–60c, rollover detection algorithm 58, arming algorithm 65, and arbitration block 68 may be implemented in software processed by the MCU 20. Further, the arbitration block 68 may receive other possible signals, such as resets, overrides or false indicators, if desired, and may control the rollover command signal 56 based on these signals.

Figure 3:
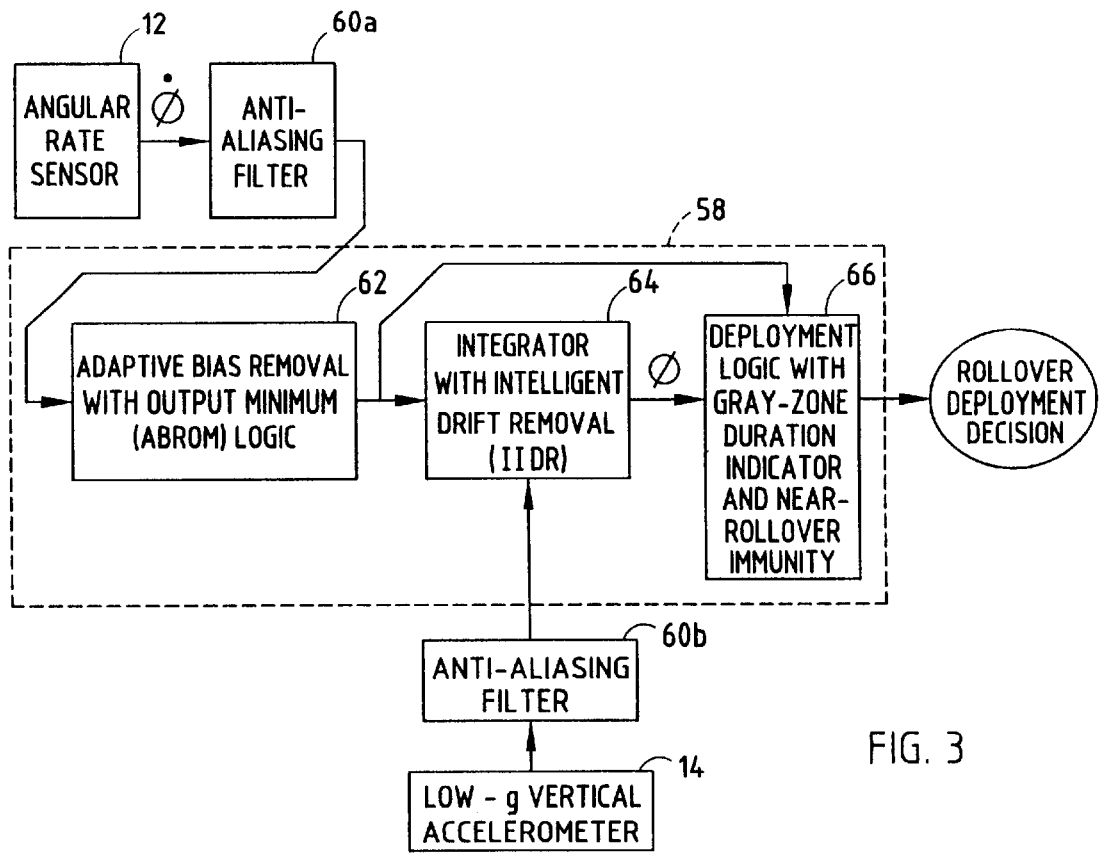
FIG. 3 is a block/flow diagram illustrating a rollover sensing algorithm for detecting vehicle rollover with the rollover sensing module according to the present invention.

Referring to FIG. 3, the rollover detection algorithm 58 is shown for detecting a vehicle rollover about the longitudinal axis of the vehicle. The rollover detection algorithm 58 is preferably implemented in software that is stored in read-only memory (ROM) internal to the MCU 20. However, it should be appreciated that the algorithm for detecting a rollover condition of a vehicle according to the present invention can be implemented with analog circuitry and/or digital processing. It should also be appreciated that while a vehicle rollover condition about the longitudinal axis of the vehicle is detected by the rollover detection algorithm, the algorithm can likewise be used to detect a vehicle pitchover about the lateral axis of the vehicle by sensing pitch angular rate in place of the roll angular rate.

The vehicle rollover detection algorithm 58 receives the sensed angular (e.g., roll) rate signal $\phi$ generated by the roll angular rate sensor 12, and further receives the sensed low-g vertical acceleration signal generated by the vertical accelerometer 14, and processes the roll rate signal and vertical accelerometer signal to generate a vehicle rollover deployment decision. The angular rate sensor 12 supplies a signal proportional to the rate of angular rotation about the sensing axis, such as the roll rate about the longitudinal axis of the vehicle. With conventional angular rate sensors, the sensed rate signal typically includes a non-zero bias, even when the vehicle is at rest, which can falsely indicate the presence of a roll rate. In addition, the non-zero bias can change significantly with the temperature of the roll rate sensor 12, and can further drift in value as the sensor ages.

The rollover detection algorithm 58 employs an adaptive bias removal with output minimum (ABROM) logic 62 for eliminating bias and further reducing noise associated with the sensed angular rate signal. The ABROM logic 62 effectively removes constant and slowly-varying offset bias, as well as small amplitude signals, thereby eliminating spurious noise and low level non-rollover signals, such as may occur on rough roads or during abusive vehicle driving conditions. The rollover detection algorithm preferably employs the ABROM logic 62 as is described later herein in greater detail in connection with FIGS. 8–10.

Figure 4:
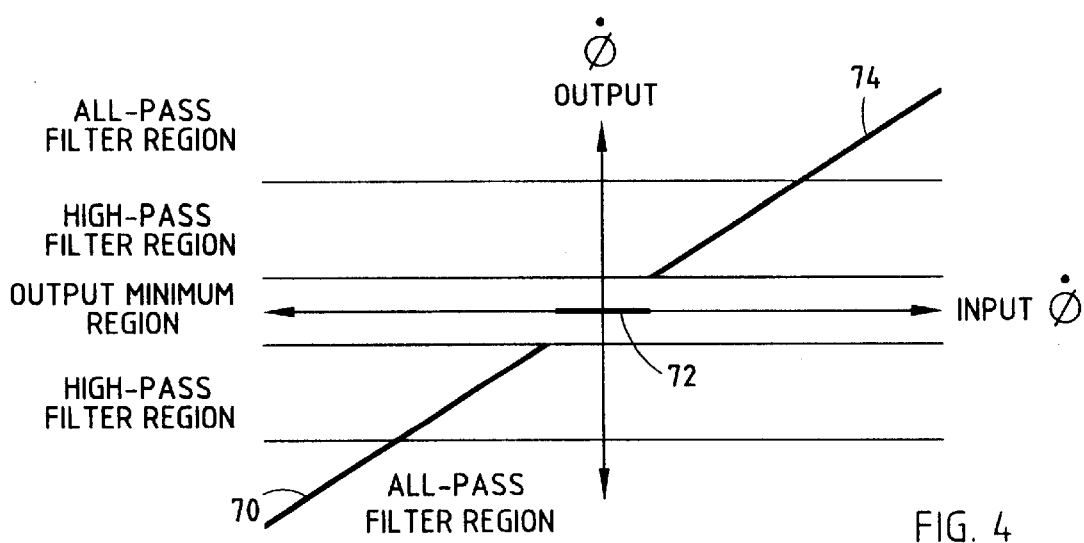
FIG. 4 is a graph illustrating regions of operation of the adaptive bias removal with output minimum (ABROM) logic.

Referring briefly to FIG. 4, the various regions of operation for one example of an amplitude response of the ABROM logic 62 is illustrated therein. The sensed angular rate input signal $\phi$ is divided into separate regions that determine the angular rate output signal $\dot{\phi}$. The ABROM logic 62 produces an output signal $\dot{\phi}$ set equal to zero when the angular rate input signal is below a minimum value, which defines an output minimum region, as is shown by line 72. The minimum value may be equal to ± five degrees/second, according to one example. When the angular rate input exceeds the output minimum value, the ABROM logic 62 output signal is substantially linear through the all-pass filter region and substantially linear for signals with frequency content substantially higher than the cut off frequency of the high-pass filter through the high-pass filter regions as shown by lines 70 and 74. The high-pass filter region removes low-level constant or slowly varying signals from the output rate signal. According to one embodiment, the high-pass filter has a very low cut off frequency (e.g., 0.1 Hz) to remove the effects of thermal drift and aging of the sensor.

The all-pass filter region eliminates bias for high amplitude signals during which the likelihood of a rollover event is more likely to occur. The all-pass filter region passes the input rate $\dot{\phi}$ to the output with bias removed, but without filtering. Thus, with larger level signals, such as may occur during a rollover event, there is no delay or attenuation of the angular rate output signal $\dot{\phi}$. The operating regions are integrated to provide smooth operation over the entire operating range to reduce imperfections in the angular rate sensor, so that the resulting algorithm results achieve enhanced reliability.

Referring back to FIG. 3, the rollover detection algorithm 58 employs an integrator 64 with intelligent drift removal for computing a vehicle accumulated roll angle $\phi$ 62 based on the angular roll rate history. The integrator 64 preferably includes an infinite impulse response (IIR) integrator that performs backward integration, which should be readily apparent to those skilled in the art. The integral (roll angle $\phi$) is monitored and adjusted periodically to remove biases that may have corrupted the signal, as explained herein. The dynamics of this integration provides immunity to remaining sensor biases, noise, and non-rollover events, while providing for adequate detection of slow rollover events and two-step rollovers that may be encountered in vehicle usage.

The rollover detection algorithm 58 further includes deployment logic 66 with gray-zone duration indicator and near-rollover immunity which processes the roll angle $\phi$ and the sensed and processed angular rate $\dot{\phi}$, and generates a rollover deployment decision. The combination of the roll angle $\phi$ and the processed angular rate signal $\dot{\phi}$ are compared against two threshold curves to determine whether or not to generate the rollover deployment signal 56. If the combination of roll angle $\phi$ and angular rate signal $\dot{\phi}$ exceeds an upper curve, deployment is commanded. If the combination of roll angle $\phi$ and angular rate signal $\dot{\phi}$ is less than a lower curve, deployment is never commanded. However, if the combination of the roll angle $\phi$ and rate signal $\dot{\phi}$ is between the upper and lower curves, within a gray-zone, the deployment logic 66 monitors the signal duration within the gray-zone and dynamically adjusts the upper curve relative to the lower curve, to allow for timely deployment on certain vehicle maneuvers. The deployment logic 66 further monitors the dynamics of the vehicle to detect driving conditions where a near-rollover event may occur, and provides rollover deployment immunity to certain detected near-rollover events. For example, when a vehicle approaches, but does not exceed, the vehicle static stability roll angle and quickly drops back to level ground, the deploy logic 66 may adjust the minimum deploy angle at which deployment is allowed to provide immunity to such near-rollover events. Additionally, deployment logic 66 may adjust the deployment requirements for rollover events occurring in different directions, e.g., clockwise versus counterclockwise rotations, of the vehicle.

Integrator with Intelligent Drift Removal (IIDR)

The integrator 64 with intelligent drift removal computes the vehicle roll angle $\phi$ based on the angular roll rate $\dot{\phi}$ history by continuously backwards integrating, with an infinite impulse response integration, the measured angular roll rate $\dot{\phi}$. The measured angular roll rate is sampled at regular time intervals (e.g., i-2, i-1, i, etc.), and an unlimited number of roll rate samples may be included in the integration. The integrator 64 further adjusts the roll angle $\phi$ to remove bias and monitor vertical acceleration and controls the roll angle adjustment based on a determined vehicle inclination angle.

While the ABROM logic 62 removes slowly-varying biases typically present in automotive-grade angular rate sensors, practical implementation of control algorithms and lower cost fixed point microprocessors generally must accommodate further sources of error. In fixed point mathematics, there typically exists a limited number of bits of resolution made available. As a consequence, the numeric representation of signals (variables) generally must be balanced by trading off between the available range and the smallest resolution of the variable. Generally speaking, the wider the range allowed, the larger the minimum resolution of the variable must be. For variables with wide dynamic ranges, such as with the angular rate signal, the larger required range implies a lower limit on the resolution. Thus, affordable low-cost microprocessors offer less processing bits, and thus the resolution is also generally poorer. Because of the limited resolution, a difficulty arises when integrating the angular rate signal to determine roll angle, and there will typically be small errors on every signal. Since the process of integration is a summing operation, these small errors can compound over time. Over a sufficiently long period of time, the compounded errors could add up to an appreciable error in the roll angle signal. It should also be appreciated that other sources of noise and error can also contribute in a similar way to the roll angle errors. Accordingly, inherent errors in the microprocessor can conspire to create error in the signal processing.

The present invention achieves a low-cost rollover detection apparatus which adjusts the integral periodically to remove the biases that may have corrupted the signal, and thus allows for use of a minimal number of sensors and an affordable controller. The rollover detection apparatus further monitors vertical acceleration over a long period of time and determines if the vehicle is at a significant inclination angle. If the vehicle is at a significant inclination angle, adjustment of the roll angle is suspended. Thus, the use of the vertical acceleration signal to suspend the roll angle adjustment provides an adaptive method to preserve legitimate signals that factor in an inclination angle of the vehicle, such as when the vehicle is travelling on a sloped roadway for a significant period of time. This may be especially true when the vehicle is driving off-road on hilly terrain.

Figure 5A:
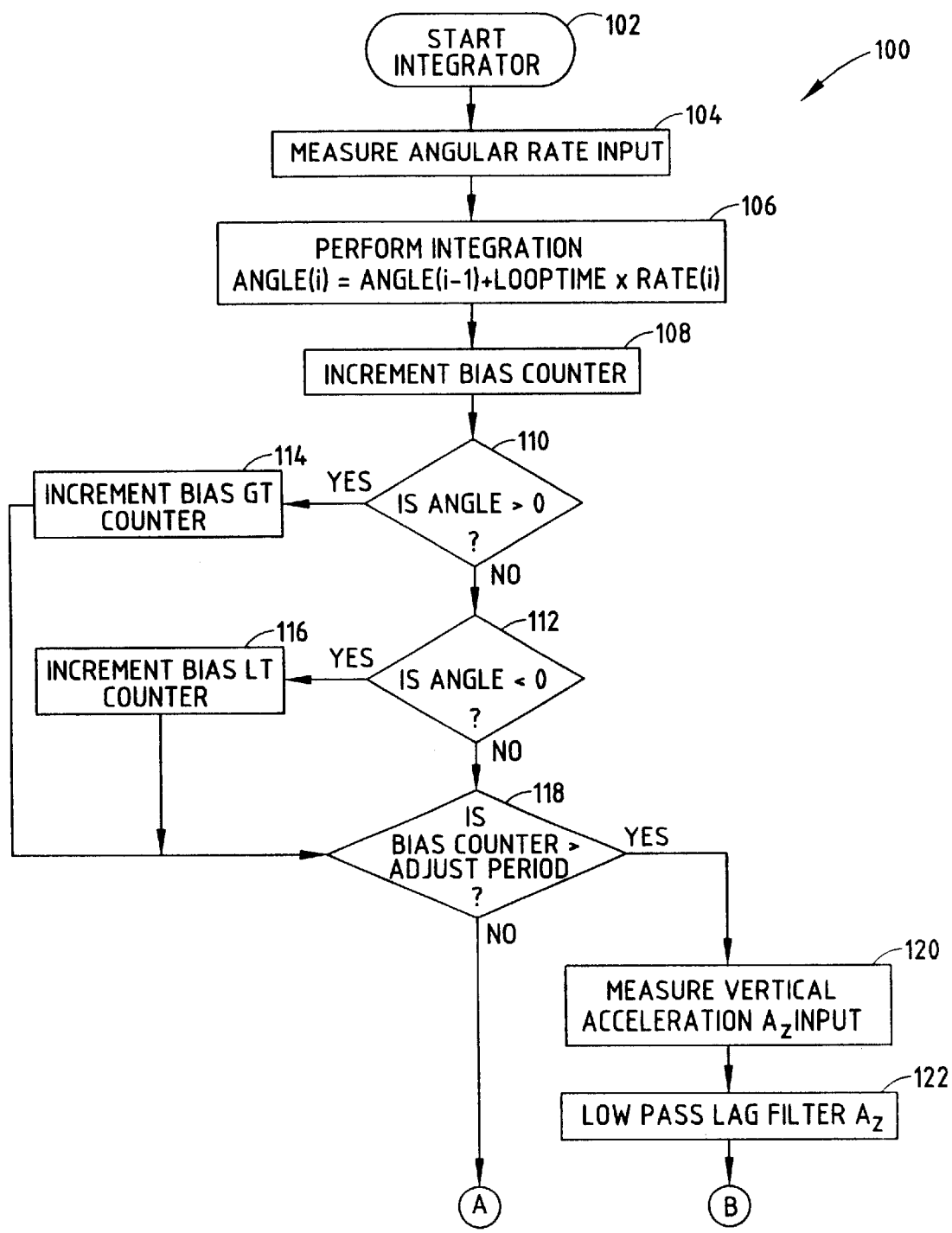
FIGS. 5A and 5B are a flow diagram illustrating the central routine for the integrator with intelligent drift removal.
Figure 5B:
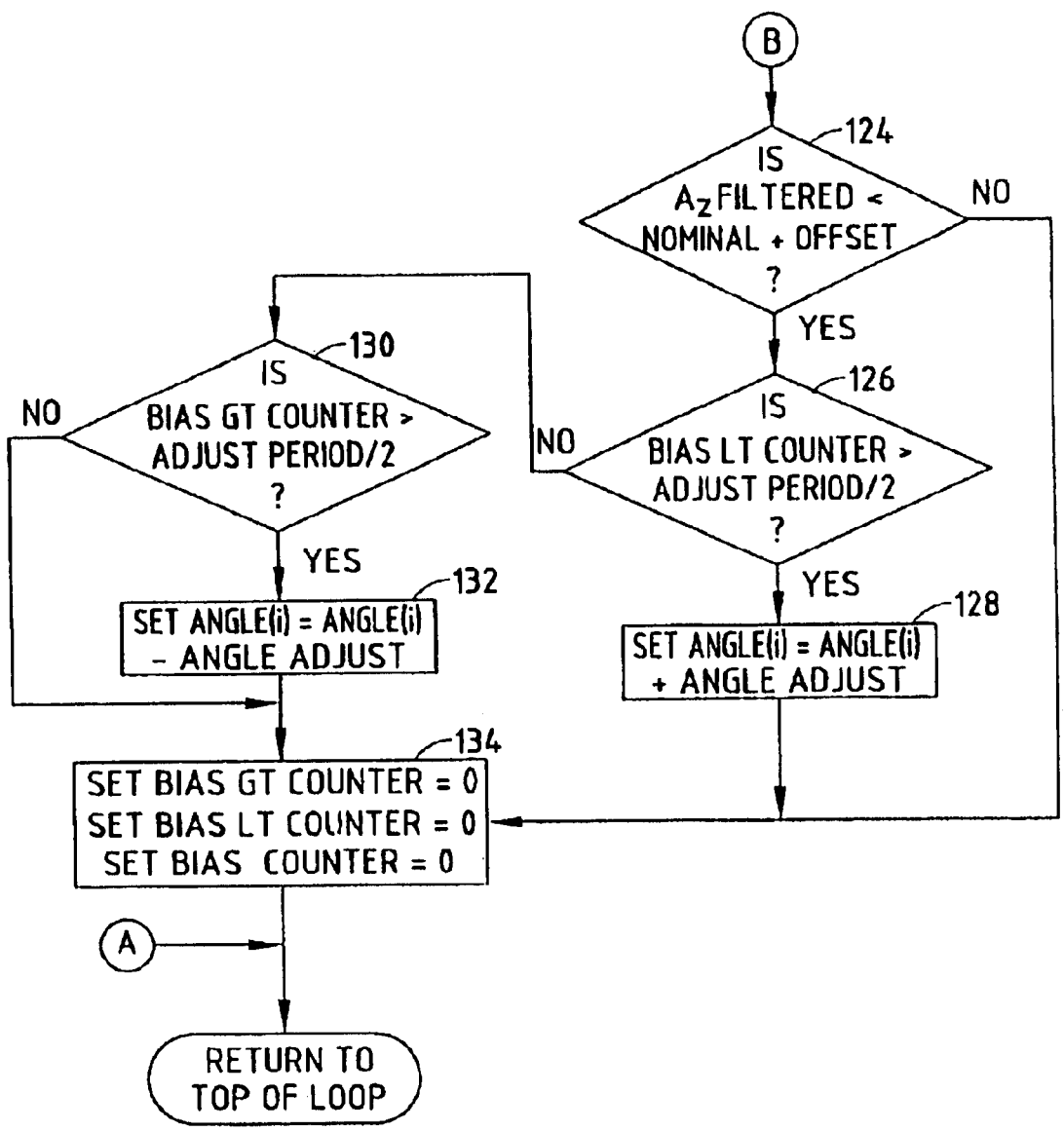

Referring to FIGS. 5A and 5B, a routine 100 is illustrated for performing the integration of the angular rate signal $\dot{\phi}$ to produce the roll angle $\phi$ and adjusting the roll angle to eliminate bias, while suspending the adjustment when a long-term inclination angle of the vehicle is detected by the vertical accelerometer. The routine 100 starts at step 102 and proceeds to step 104 to measure the angular rate input received from the ABROM logic 62. Next, in step 106, routine 100 performs a mathematical integration of the measured angular rate signal to produce a roll angle at current time step i. The integration computes the product of the current rate (i) and loop time and sums the product with the previous integration values for times i-1, i-2, etc. The integration process is a backward integration, which should be evident to those skilled in the art.

Following integration step 106, routine 100 proceeds to step 108 to increment a bias counter. Next, the roll angle is compared to zero degrees in decision steps 110 and 112. If the roll angle is greater than zero degrees in step 110, routine 100 proceeds to increment a bias greater than (GT) counter in step 114. If the angle is less than zero degrees, routine 100 proceeds to increment a bias less than (LT) counter in step 116. Following either of the increment steps 114 or 116 or if the angle is equal to zero degrees, routine 100 proceeds to decision step 118 to check if the bias counter has exceeded an adjust period limit having a predetermined time value, such as twenty (20) seconds, which establishes the long-term time period for detecting the vehicle roll inclination angle. In effect, the bias counter acts as a timer, such that if the time limit has not been reached, then control is returned to the top of the control routine 100.

By comparing the roll angle to the level ground value of zero degrees in decision steps 110 and 112, it is assumed that the vehicle returns to a roll angle of approximately zero degrees over a sufficiently long period of time. By using this assumption, the rollover detection is valid over a very wide range of driving scenarios without requiring additional sensors and hence cost to the rollover detection apparatus.

If the bias counter exceeds the adjust period, the vertical acceleration $A_Z$ of the vehicle is measured in step 120 and is further low-pass lag filtered in step 122. The low-pass lag filter provides low-pass filtering with coefficients designed to remove short-term variations and road noise. A typical low-pass lag filter delay in the range of about 0.3 to 5.0 seconds may be employed. The filter delay should be shorter than an adjust period. The low-pass lag filtered acceleration input is then compared to the summation of a nominal value and an offset value in decision step 124, in order to determine if the vehicle is currently at a roll inclination angle sufficiently rotated away from a level ground of zero degrees. The nominal value is the expected value during level driving of the vehicle, and may include a typical value of −1 g (i.e., 9.8 meters/second/second) representing the acceleration of gravity on the surface of the Earth. Alternately, a built-in nominal value of 0 g may be employed with the nominal value. The offset value is the worst-case limit of all sensor errors, including the summation of manufacturing tolerances, temperature effects, aging effects, and other non-signal related biases. The magnitude of the offset value may include a typical value in the range of about 0.5 to 0.01 g. However, it should be appreciated that further refinements in sensors or bias compensation may further reduce the offset value.

If the value of the filtered low-g vertical acceleration $A_Z$ is less than the summation of the nominal value and the offset value, it is determined that the vehicle is not at a significant roll inclination angle, and routine 100 proceeds to provide an adjustment to the roll angle. To provide adjustment to the roll angle, routine 100 checks for whether the bias LT counter is greater than one-half of the adjust period in decision step 126. If the bias LT counter is greater than one-half the adjust period, the roll angle is adjusted to be increased by an angle adjust value in step 128. If the bias LT counter is not greater than one-half the adjust period, routine 100 proceeds to decision step 130 to check if the bias GT counter is greater than one-half the adjust period and, if so, adjusts the angle to subtract the angle adjust value. Following either adjustment in steps 128 and 132, or in a case where both the bias GT counter and the bias LT counter do not exceed half of the adjust period, the counter is reset in step 134, and control then passes back to the top of the control loop.

If the filtered value of the low-g vertical acceleration is greater than or equal to the summation of the nominal value and the offset value, as determined in decision step 124, routine 100 determines that the vehicle is positioned at a significant roll inclination angle. If the vehicle is determined to be positioned at a significant roll inclination angle, routine 100 performs no adjustment to the roll angle and, instead, proceeds directly to step 134 to reset all of the counters to zero. Following step 134, routine 100 returns to the top of the control loop.

Accordingly, the integrator 64 with intelligent drift removal and its control routine 100 monitors and adjusts the roll angle φ periodically to remove biases that may corrupt the roll angle signal when the filtered vertical acceleration $A_Z$ is less than the summation of the nominal and offset values. Whenever the filtered vertical acceleration $A_Z$ reaches the summation of the nominal and offset values, indicative of a long-term significant roll inclination angle experienced by the vehicle, the periodic bias adjustment is prevented. Thus, the significant roll inclination angle is factored into the roll angle and is used to anticipate an upcoming rollover event of the vehicle. By preventing further adjustment of the roll angle while the vehicle is experiencing a significant roll inclination angle, legitimate roll angle signals are preserved and are compared to the deploy threshold curve to determine the rollover deployment decision. This results in an adaptive roll angle adjustment.

The implementation of the decay is highly efficient in microprocessor resources. The use of the filtered vertical accelerometer signal $A_Z$ to suspend the adjustment provides an adaptive method to preserve legitimate signals that may be important to proper functioning of the rollover deploy command. Accordingly, the vertical accelerometer detects a significant roll inclination angle and prevents adjustment to the integration output angle, while preserving bias removal as long as the vehicle is not experiencing any significant roll inclination angle. The vertical acceleration signal $A_Z$ is low-pass filtered so as to remove high frequency signals. Thus, the filtered vertical acceleration signal provides a long-term average value indicative of the vertical forces applied to the vehicle relative to the orientation of the vehicle. During a normal level driving condition, the vertical force would be equal to gravity on the surface of the Earth which is approximately 9.8 meters/second/second. When the sensed vertical acceleration value differs to a lesser value, it is assumed that the vehicle is oriented on an incline. The amount of force generated can be represented by a cosine of the angle of inclination multiplied by the Earth's gravitational force. While a vertical accelerometer is shown and described herein for determining a vehicle roll inclination angle, it should be appreciated that other sensors may be employed to provide an indication of the inclination of the vehicle, without departing from the teachings of the present invention.

Deployment Logic with Gray-Zone Duration Indicator

Figure 6:
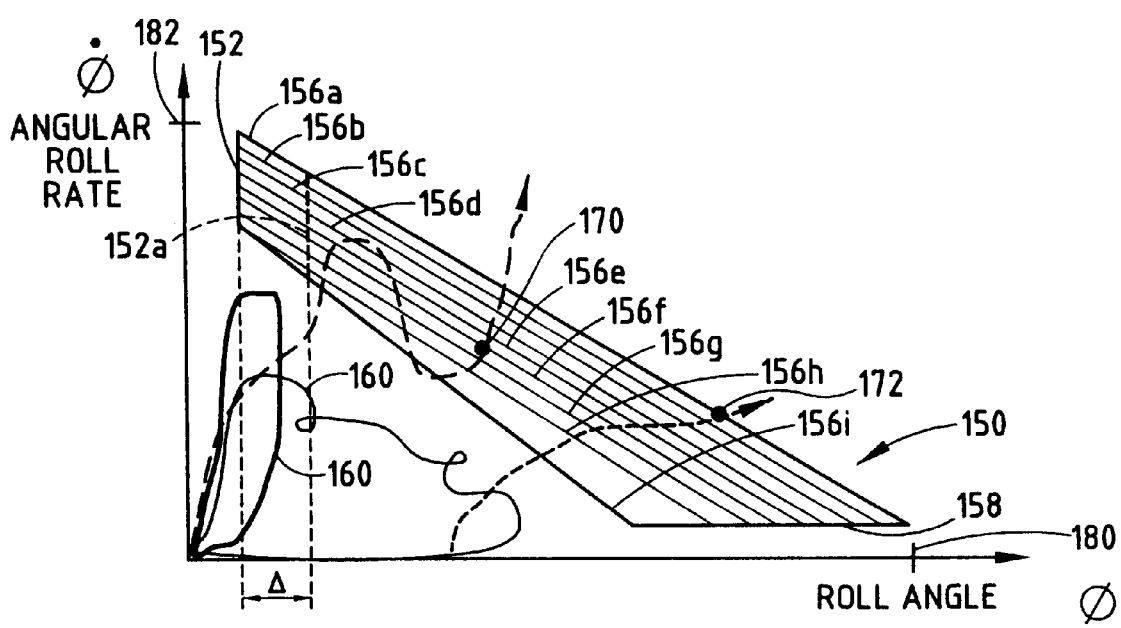
FIG. 6 is a graph illustrating a gray-zone duration indicator employed by the deployment logic.

The deployment logic 66 with gray-zone duration indicator and near-rollover immunity generates a rollover deployment signal based on the roll angle φ and sensed angular rate φ̇ output from the ABROM logic 62. Referring to FIG. 6, one example of a gray-zone 150 is illustrated therein. The deployment logic 66 compares the sensed angular rate $\dot{\phi}$ and the roll angle $\phi$ against two threshold curves, namely an all-deploy (upper) curve (line) 156a, beyond which a deployment is always commanded, and a no-deploy (lower) curve (line) 156i, below which a deployment is never commanded. The region between these two curves is termed the gray-zone 150. The deployment logic monitors the signal duration within the gray-zone 150, and dynamically adjusts the all-deploy curve closer towards the no-deploy curve. This allows for timely deployment on corkscrew and other events involving complex vehicle motions, while a decay factor provides immunity to threshold non-trigger events, such as ramp jumps or off-road driving conditions.

The vertical axis of the gray-zone duration indicator is the instantaneous value of the angular roll rate $\dot{\phi}$ following processing by the ABROM logic 62. The horizontal axis is the current value of the roll angle $\phi$, as determined by the integrator 64. For convenience of description herein, both roll rate $\dot{\phi}$ and roll angle $\phi$ are considered as absolute values, however, in general, these values can be either positive or negative numbers. It should also be important to appreciate that clockwise and counterclockwise rollovers may have different requirements, and therefore may employ separate calibrations with minor changes to the deployment logic and an increase in the number of adjustable parameters.

The curvaceous paths illustrated in FIG. 6 represent the trace of pairwise points (angle $\phi$, rate $\dot{\phi}$) for several representative rollover and near-rollover events. Paths 160 show non-rollover events, while paths 170 and 172 show rollover events. On the horizontal axis, representing the current roll angle value $\phi$, is the static stability angle 180 which is the roll angle at which the vehicle is perfectly balanced on two wheels (on the same side of the vehicle), and any further increase in angle will result in the vehicle tipping over onto its side. For a typical passenger vehicle, the static stability angle 180 for rollovers may range from forty-six (46) to seventy (70) degrees, depending on the vehicle. On the vertical axis, representing the roll rate $\dot{\phi}$, is the impulse rollover rate 182 which, when applied at an angle of zero degrees, will cause the vehicle to pass through the static stability angle and rollover. Between the two extreme values 180 and 182, and typically lower in magnitude, is the all-deploy line (curve), such as line 156a, which represents pairs of angle and rate, such that any pair of angle and rate on or above the all-deploy line will nominally indicate a deploy condition. The all-deploy line is shown here as a straight line, however, consideration of the vehicle suspension dynamics and other non-idealities in the vehicle structure may conspire to make this boundary a complex shape. The shape and slope of this line may also depend on additional input signals, such as vertical or lateral acceleration signals. However, for simplicity of discussion, the all-deploy line is assumed to be linear and of a single slope. It should be noted that the current invention extends to arbitrary complex shapes of the all-deploy line, without departing from the spirit of the present invention.

Within the gray-zone 150, pairwise points of rate and angle may involve either rollover events which have not yet accumulated sufficient energy to rollover, or very severe non-rollover events. The gray-zone 150 is considered an arbitrarily fine line between deploy and non-deploy events. Factors such as vehicle-to-vehicle variation and manufacturing tolerances in components require a degree of separation between the all-deploy and no-deploy events when calibrating the rollover detection algorithm.

The gray-zone 150 is limited at or away from the axes to provide immunity against pairs of angle and rate that may instantaneously exceed the all-deploy line, but are of insufficient severity to command a deployment. The left boundary 152 of the gray-zone 150 is defined by a minimum roll angle lower limit required before allowing a deployment. The bottom boundary 158 of the gray-zone 150 is defined by a minimum angular roll rate at which the rollover detection algorithm will be allowed to deploy the rollover decision, and is used to prevent deployment on very slow roll events, such as roll experienced in a parking lot sink hole. The minimum roll angle 152 and roll rate 158 are calibratible parameters that are set in the rollover detection algorithm.

Vehicle events causing the angle and rate pair to spend an appreciable amount of time within the gray-zone 150 are given special consideration. In crash events, the vehicle may undergo complex motions before eventually rolling over. The ability to dynamically adjust the all-deploy line is allowed if the time duration within the gray-zone 150 is appreciable. For these types of events, the gray-zone time duration is used to lower the all-deploy line closer to the no-deploy line. The longer the time duration within the gray-zone, the more likely the event will trigger deployment of safety devices.

The minimum deploy angle has a lower bound limit shown by line 152, which serves as the default limit. During normal vehicle operation, the minimum deploy angle is set at the minimum limit 152. During certain near-rollover events, the minimum deploy angle is increased by delta $\Delta$ to line 152a so as to prevent the deployment of a rollover command signal during the near-rollover event. When the near-rollover event has passed and the vehicle returns to a normal operation, the minimum deploy angle returns to the minimum limit default setting on line 152. Accordingly, by shifting the minimum deploy angle to line 152a, severe events which cause a near-rollover, but are short of a rollover event, may be prevented from triggering the deployment of a rollover command signal, especially during the impact associated with the return to a level surface.

The deployment logic 66 processes the integrated angle $\phi$ and the angular rate $\dot{\phi}$ with logic that indicates whether these signals, in combination, are indicative of an anticipated rollover event, preferably sufficiently prior to an actual rollover occurrence. In many schemes, in order to make the rollover detection algorithm sensitive enough to detect a rollover condition during the early stages of such an event, there is the risk that the rollover detection algorithm may deploy the rollover decision on certain non-rollover events of sufficient severity. One example is the return of the vehicle to a level fall from a near-rollover event, as explained below.

A vehicle can be characterized by the static stability angle, which is the roll angle at which the vehicle center of mass is directed above the line between two tires on the same side of the vehicle, which is typically about forty-five (45) to seventy (70) degrees, depending on the type of vehicle. Under certain driving conditions, a vehicle may sustain an increased roll angle to nearly that of the static stability angle, without triggering the rollover deployment command signal. If one side of the vehicle ramps upward, once the vehicle is rolled nearly to the static stability angle, the vehicle may suddenly drop back to a substantially level surface. This drop may develop a large velocity on the downward returning side of the vehicle and, when the vehicle impacts the ground, the sensors may record a very severe event. In effect, the vehicle may be slammed onto the suspension hard enough to travel to the hard bumper stops of the vehicle, possibly even rotating further as the tires compress and the vehicle suspension flexes. This over travel can amount to ten degrees or more of rotation opposite to the original climbover, and is associated with high angular rates and large values of acceleration in both the lateral and vertical directions. Since a vehicle rollover did not occur in this near-rollover scenario, it would be appropriate for the rollover detection apparatus not to deploy a rollover command signal. In accordance with the present invention, the minimum angle at which deployment is allowed is adjusted so that the rollover detection is immune to these types of near-rollover events.

Figure 7A:
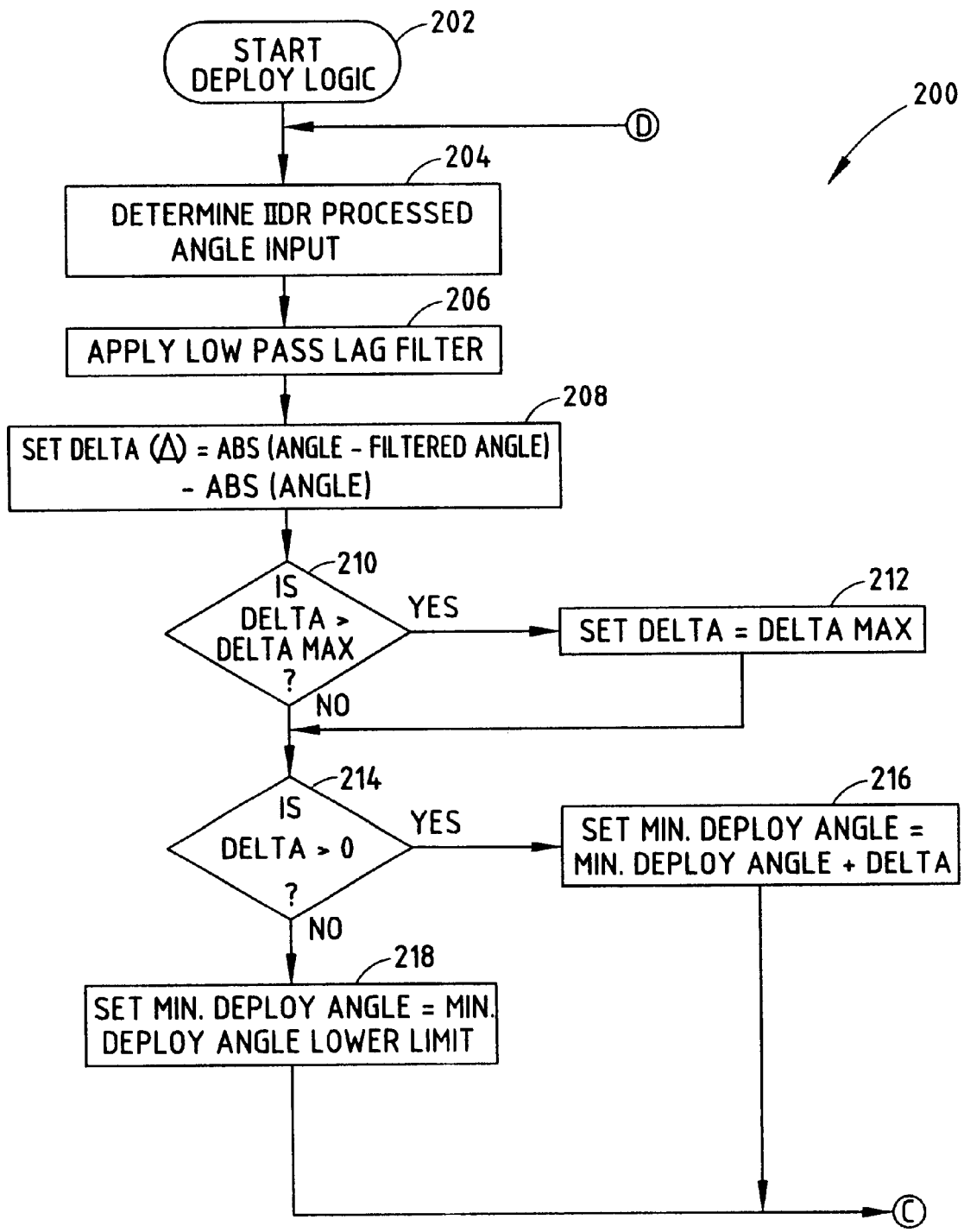
FIGS. 7A and 7B are a flow diagram illustrating the central routine for the deployment logic with gray-zone duration indicator and near-rollover immunity.
Figure 7B:
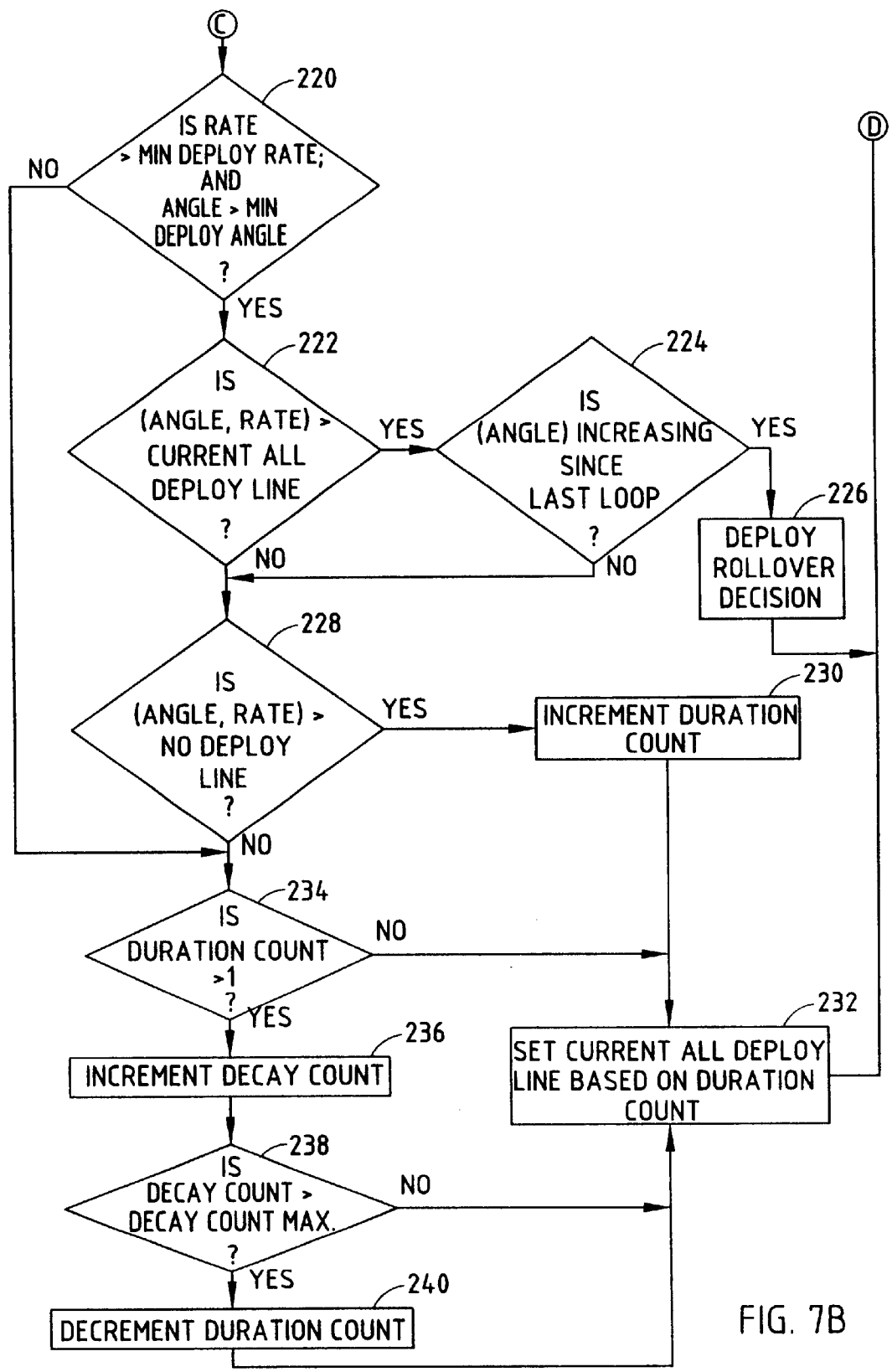

Referring to FIGS. 7A and 7B, the deployment logic routine 200 is illustrated for adjusting the minimum deploy line and adjusting the all-deploy line based on a gray-zone time duration. Deployment logic routine 200 starts at step 202 and proceeds to step 204 to determine the angle input processed by the integrator 64. Next, a low-pass lag filter is applied to the angle in step 206, such that the angle signal is delayed by a time period of about 0.3 to 0.5 seconds. Thus, the low-pass filter may be designed with a group delay in the range for signals with frequency content from about 0.01 Hz to 2.0 Hz. The low-pass filtering also prevents false triggering based on short-term spikes which may occur in the integration output angle.

In step 208, deploy logic routine 200 computes value delta $\Delta$ which is defined as the difference of the absolute value of the instantaneous angle subtracted from the absolute value of the difference between the instantaneous angle value and the group delayed (filtered) angle. Thus, the calculation of delta $\Delta$ achieves a value which is only positive if the group delayed angle is one polarity and the instantaneous angle is an opposite polarity, and only when this difference exists over durations shorter than the group delay time period.

Next, in decision step 210, routine 200 checks whether delta $\Delta$ is greater than a pre-specified delta max limit, and if so, sets delta $\Delta$ equal to the delta max limit in step 212. Following steps 210 and 212, routine 200 proceeds to check if delta $\Delta$ is greater than zero and, if so, sets the minimum deploy angle equal to the minimum deploy angle increased by delta $\Delta$ in step 216. Otherwise, the minimum deploy angle is set equal to the minimum deploy angle lower limit in step 218. Thus, if the vehicle is at a roll angle at the current time instant, but was at zero roll angle very recently, then delta $\Delta$ will be equal to a value of zero. If the vehicle has a roll angle that has been increasing steadily over a duration comparable to the group delay time of the filter, then delta $\Delta$ will be negative. So, if delta $\Delta$ is zero or less, the minimum deploy angle is set to the default minimum value. However, if delta $\Delta$ is positive, indicating that the vehicle is returning from a near-rollover condition, then the value of delta $\Delta$ is added to the default minimum value to determine the current setting of the minimum deploy angle. Thus, for a time period such as 0.3 to 0.5 seconds following a near-rollover event, the minimum deploy angle will increase temporarily, thereby giving additional immunity against this severe, but non-rollover event.

Following adjustment of the minimum deploy line, the deployment logic routine 200 proceeds to the steps shown in FIG. 7B to adjust the all-deploy line based on the gray-zone time duration. In decision block 220, deployment logic routine 200 checks if the two following conditions are met: (1) the angular rate is above the minimum rate value; and (2) the computed roll angle is above the minimum angle value. For clarity, only positive values are considered herein, but the concept is equally valid for negative values and negative rates. Next, in decision step 222, deployment logic routine 200 checks for whether the pairwise combination of roll angle and rate exceeds the all-deploy line. If the all-deploy line is exceeded, then decision step 224 checks if the roll angle has actually been increasing since the previously iteration through the deployment loop. This concept of using previous iterations to look for an increasing angle may be extended to include a weighted sum of several prior samples of the roll angle $\phi$. Provided the roll angle $\phi$ has been increasing, a rollover deployment decision is generated in step 226. Otherwise, routine 200 proceeds to decision step 228.

The check provided in step 224 ensures that deployment will only be commanded at a point in time when the roll angle $\phi$ is actually increasing towards the rollover point. In addition, this check provides additional immunity against a class of vehicle motions where a substantial angle has already been accumulated, and then the vehicle experiences a sharp angular rate in the opposite direction. Without this check, such a non-rollover driving scenario could possibly lead to an inadvertent deployment. In an embodiment where separate calibrations are used for clockwise and anti-clockwise rollovers, the logic which checks for whether the roll angle is increasing instead becomes a check to verify that the roll angle and the roll rate are of the same sign.

If the pairwise combination of roll angle and roll rate is below the current all-deploy line, or if the roll angle is not increasing, then decision step 228 checks for whether the roll angle and rate pair varies within the gray-zone, by being above the no-deploy line. If the angle and rate pair is within the gray-zone, then the duration counter is incremented in step 230, and the all-deploy line is adjusted in step 232 based on the duration count. Adjusting the all-deploy line based on the duration count of the roll angle and rate pair being within the gray-zone provides timely deployment for a wide range of rollover events. In scenarios where the rollover is initiated suddenly, even violently, such as a lateral curb trip or a lifting knock-over impact, the roll angle and rate pair will rise rapidly, and quickly surpass the all-deploy line. However, during rollovers involving complex motions, such as a corkscrew, certain fallovers, rollovers during off-road driving, or concatenated events leading up to a rollover, the vehicle may hover briefly, or undergo auxiliary impacts before reaching a critical point requiring deployment. If the vehicle attitude moves within the gray-zone momentarily, but then returns to a substantially level position, no deployment is typically required. However, a more sustained duration within the gray-zone may also indicate a severe event in progress and, in such cases, when the vehicle motion finally advances inexorably towards rollover, deployment is often required without delay. To accomplish these goals, the gray-zone duration indicator will gradually reduce the all-deploy line, such as from line 156a to line 156b or further to any of lines 156c–156h, thereby effectively collapsing the gray-zone to allow this class of events to achieve a timely deployment when needed.

Adjustment of the all-deploy line may be regarded as a linear interpolation of the end points of the all-deploy line towards the no-deploy line. Each advance of the all-deploy line closer to the no-deploy line is made based on the duration of the angle and rate pairwise samples being within the gray-zone. A sufficiently long duration within the gray-zone will eventually command a deployment. The rate of advance of the all-deploy line towards the no-deploy line is an adjustable or calibratible parameter of the algorithm. According to one example, three to five samples within the gray-zone are required before the all-deploy and no-deploy lines coincide. While a linear straight line interpolation is described herein, the present invention also extends to non-linear interpolation, and piece-wise linear boundaries of the gray-zone. Adjustment of the all-deploy line should be reset back to the original default value, after a near-rollover event concludes.

If the pairwise combination of roll angle and angular rate is determined not to be above the no-deploy line as determined in step 228, control passes to decision step 234 to check if the duration count is greater than one. If the duration count does not exceed one, then routine 200 proceeds to set the all-deploy line in step 232. Otherwise, if the duration count exceeds a value of one, routine 200 increments the decay count in step 236, and then proceeds to decision step 238 to check if the decay count is greater than a decay count maximum value. Once the decay counter reaches a preset maximum count, then the duration count is decremented in step 240, and the all-deploy line is adjusted based on the duration count in step 232. The purpose of the decay count is to preserve the duration count for a brief period of time should the vehicle motion pass out of the gray-zone momentarily. The decay count maximum value is set so that concatenated events receive a timely deployment, while rough road or near-rollover events with only periodic excursions into the gray-zone receive immunity offered by the default all-deploy threshold. After the adjustments have been made to the all-deploy line, control is returned to step 204 for the next loop of sample iterations for routine 200.

Accordingly, the deployment logic 66 provides a variable threshold for comparison with the roll angle to determine whether to deploy a rollover decision. The variability of the rollover threshold allows for the timely detection of certain vehicle driving events so as to predict in advance an upcoming rollover event. The variable threshold further allows for the detection of very near-rollover events which fall short of an actual rollover event, so that the rollover detection does not produce a rollover decision.

Adaptive Bias Removal with Minimum Output (ABROM) Logic

The ABROM logic 62 processes digitally sampled input signals in such a way that constant or slowly-varying biases are removed, small noise signals are eliminated, and large-amplitude signals are passed with an adjusted bias to achieve signals with optimal accuracy. The ABROM logic 62 is particularly useful for processing signals sensed via an angular rate sensor for use in the rollover detection apparatus of the present invention. However, it should be appreciated that the ABROM logic 62 is also useful for processing signals generated by other sensing devices for use in various applications, without departing from the teachings of the present invention.

The ABROM logic 62 has three primary regions of operation according to the embodiment shown. These three primary regions of operation are shown in FIG. 4. In the high-pass filter region, for small amplitude signals below an adaptive threshold, a high-pass filter is applied. In the all-pass region, for larger amplitude signals above the adaptive threshold, the signals are passed unchanged, except for the removal of the most recent bias estimate, which is derived from the high-pass filter. If the output of the high-pass filter is below a minimum output level, then the output is forced to zero in an output minimum region.

The operation of the ABROM logic 62 provides a number of benefits by providing removal of static or slowly moving bias from a sensor generated signal. The minimum output function further provides for faster recovery from drifting input values, as compared to traditional filter approaches. The all-pass region above the adaptive threshold corrects for sensor biases, but otherwise passes the input signal to the output. This avoids filter delays associated with digital filters, and avoids attenuation of low-frequency components of the signal above the adaptive threshold. The ABROM logic 62 is applicable to systems which are monitored for intermittent, asynchronous signals, especially where bias or offset changes are poorly tolerated. For rollover detection algorithms, especially those which use integration of a sensor generated signal, the ABROM logic 62 allows for rapid response times with minimal errors.

Figure 8:
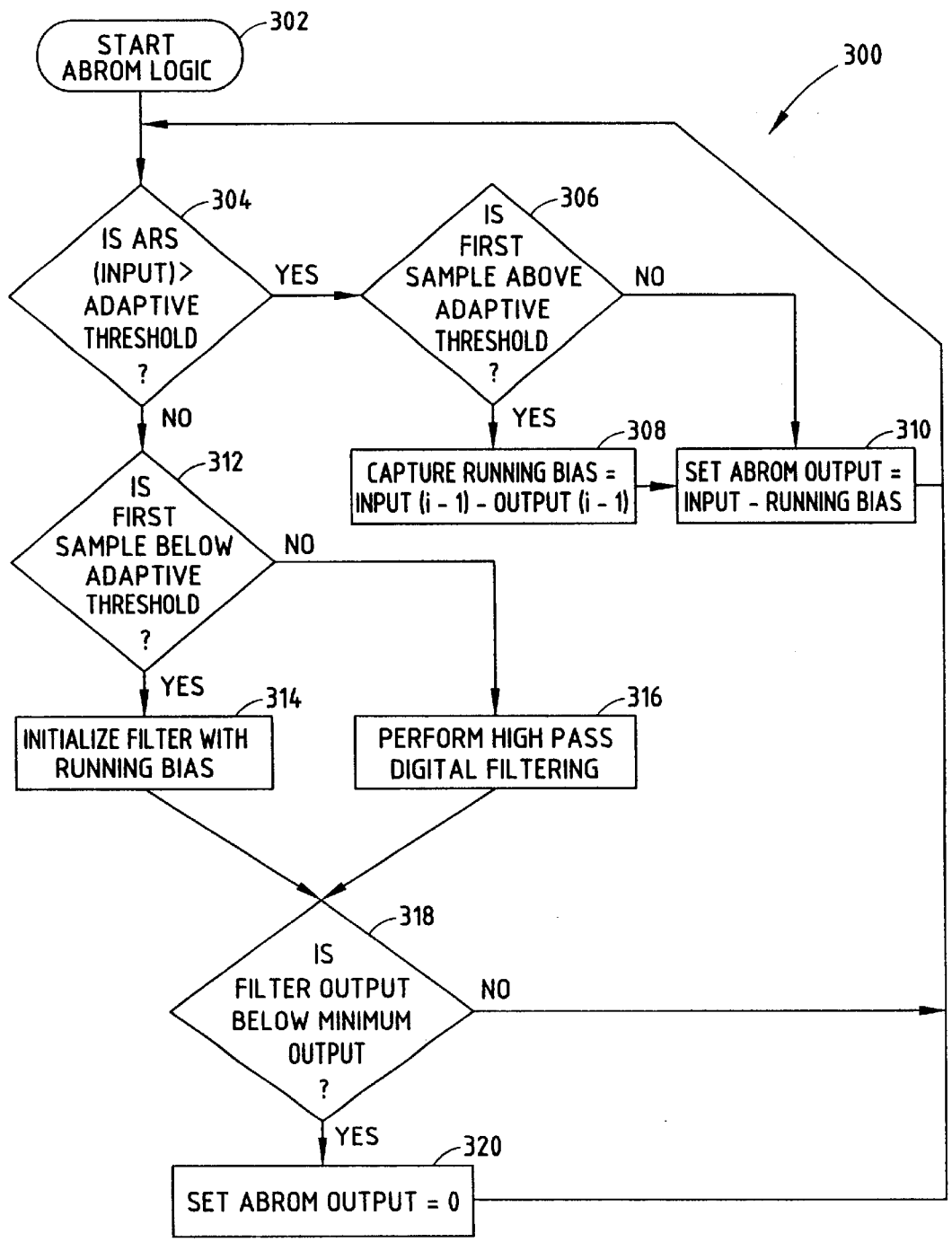
FIG. 8 is a flow diagram illustrating the central routine for the adaptive bias removal with output minimum logic.

Referring to FIG. 8, an ABROM control routine 300 is illustrated therein. Routine 300 begins at step 302, and in decision step 304 checks if the angular rate sensor (ARS) input is greater than an adaptive threshold. The absolute value of the input may be used, or different thresholds can be used on either side of zero, if desired. The check performed in decision step 304 reduces microprocessor processing time when a signal excursion above the adaptive threshold occurs. These are events intended to be detected or measured, and once such events begin, the signal should be processed as rapidly as possible.

When the first signal sample exceeds the adaptive threshold, a running bias is fixed and stored until the signal amplitude drops below the adaptive threshold. This is achieved by checking if the first sample is above an adaptive threshold in step 306 and, if so, capturing a running bias equal to the difference of the input (i-1) minus the output (i-1) in step 308. Otherwise, if the first sample is not above the adaptive threshold, in step 310 the ABROM output is set equal to the difference of the input minus the running bias. The running bias is computed by subtracting the input signal from the high-pass filter output at the most recent prior time step. The frequency response of the high-pass filter is such that constant or slowly varying biases are removed from the input such that the high-pass filter output is at or near the nominal zero value (in the absence of large-amplitude signals).

The ABROM logic is particularly useful for situations where the signals of interest are of relatively large amplitude and of relatively brief duration, as compared to the time constant of the high-pass filter. In these cases, the running bias is a good approximation of the true bias. The longer the duration of such excursions, the more error that can occur by using the running bias. While prior signal excursions above the adaptive threshold could cause the running bias to vary from the true bias, two methods are used to minimize these affects, namely, (1) reinitalizing the high-pass filter after a large amplitude excursion; and (2) using the output minimum, as described below.

Samples above the adaptive threshold (an absolute value) are passed without attenuation or delay, but are corrected by subtracting off the running bias, so that low-frequency components of the large amplitude signals will be accurately reflected in the output. For input signals which do not exceed the adaptive threshold, routine 300 proceeds to step 312 to check if the first sample is below the adaptive threshold. When the first sample is below the adaptive threshold, the filter is initalized with the running bias in step 314, before proceeding to decision step 318. However, if the first sample is not below the adaptive threshold, high-pass digital filtering is performed in step 316, prior to proceeding to decision step 318. Decision step 318 checks if the filter output is below a minimum output and, if not, routine 300 returns to step 304. However, if the filter output is below the minimum output, then routine 300 proceeds to step 320 to set the ABROM output equal to zero, prior to returning to step 304.

The running bias is the best estimate of the true bias, although it may change slightly for the duration of the signal excursion. By using the running bias as a starting point for the high-pass filter, the only error that the high-pass filter needs to correct for is the small amount of bias shift that may have occurred during the brief signal excursion above the adaptive threshold, thereby necessitating the need to correct the full amount of the bias upon initalization at a zero value before experiencing significant overshoot if the filter was used for the entire signal excursion.

It is preferred that the high-pass filter be a first order IIR filter, such as a Butterworth filter. However, the ABROM logic can be applied to filters of any order, by using successive time steps to initialize successive terms of the digital filter. Reinitializing the filter with the running bias effectively starts up the filter where it left off at the start of the signal excursion above the adaptive threshold. Any bias shift which occurred, or signal attenuation below the adaptive threshold, is all that remains for the high-pass filter to remove. Since the shifts are small, in general, the recovery is much more rapid than traditional high-pass filters.

The recovery time can be reduced with a minimum output processing technique, as described as follows. The intermediate output of the ABROM logic is either the high-pass filter output or the bias-adjusted signal if the input is greater than the adaptive threshold. If the output falls below a minimum output level, the output is set identically equal to zero. This operation allows fast recovery from any extended periods of large-amplitude inputs and reduces errors when the ABROM output is integrated, such as for rollover sensing.

Figure 9:
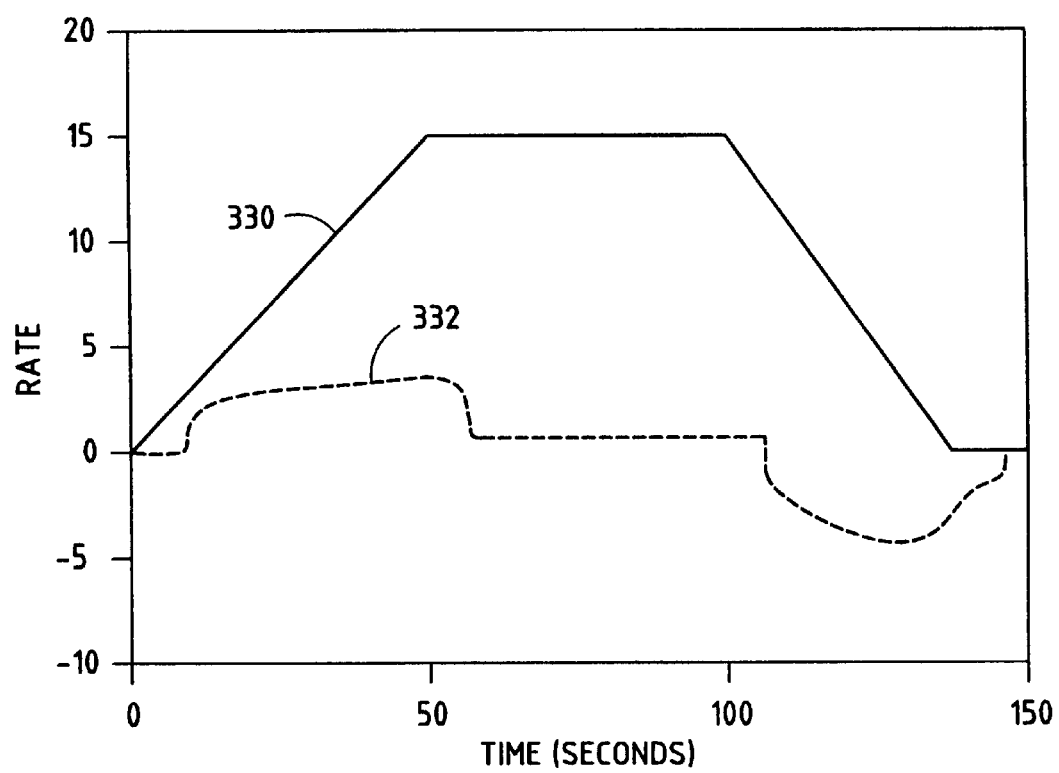
FIG. 9 is a graph illustrating bias removal from a sensed signal achieved with the adaptive bias removal with output minimum logic.

FIG. 9 illustrates the results of the ABROM logic for removing bias when the bias drifts up rapidly to a high value, resides at the high value briefly, then drifts back to zero, according to one example. The solid line 330 represents the input to the ABROM logic, and the dashed line 332 represents the output. At the early rise levels, the output 332 remains at zero according to the minimum output function. As the input signal 330 continues to rise, the output 332 begins to be attenuated according to the functioning of the high-pass filter, demonstrating asymptotic behavior up to the plateau of the input signal 330 at a time period of about fifty (50) seconds. When the bias remains at the high level, the high-pass filter causes the output to decay towards zero, until the output 332 falls below the minimum output, and then drops immediately to zero. This demonstrates a fast recovery time. When the input 330 begins to fall, at about 100 seconds, the same behavior is exhibited, except in the reverse polarity. Accordingly, the downward ramp of the input signal 330 is greater than the input ramp, leading to a higher output 332 deviating from zero. Accordingly, the bias removal of the ABROM logic does not come at the expense of signal fidelity for larger amplitude signals as described below.

Figure 10:
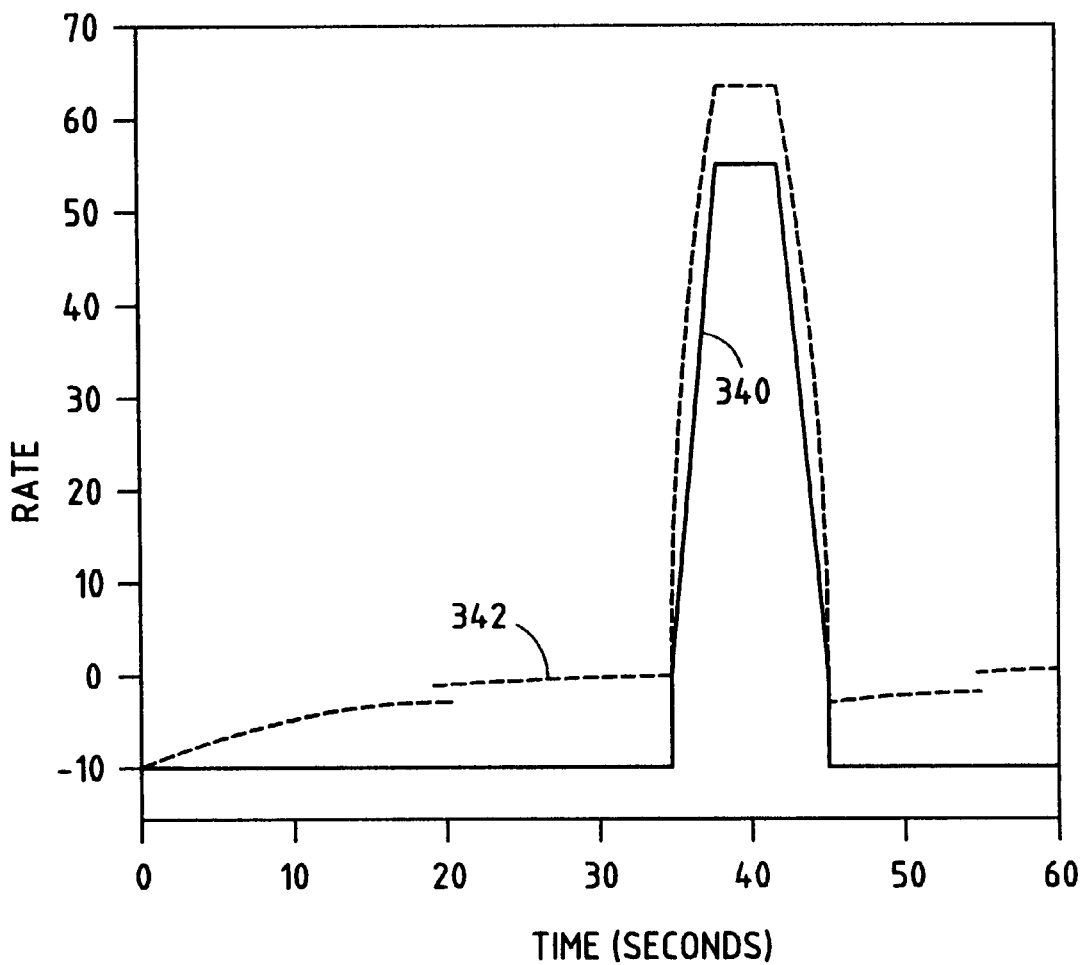
FIG. 10 is a graph further illustrating bias removal from a sensed signal achieved with the adaptive bias removal with minimum output logic.

Referring to FIG. 10, a large amplitude signal excursion is shown superimposed on a constant bias. The constant bias is set to a rate of approximately minus ten (−10) at which point the ABROM logic is initalized. The signal excursion occurs at about forty (40) seconds, and has a peak amplitude rate of about sixty (60), referenced to the bias. The maximum signal level is reached within about two seconds, and then has a plateau for several seconds, before ramping back down to the bias level. According to this example, the adaptive threshold limit is set to a value of about twenty (20), and the minimum output level is set to a value of about two (2). The solid line 340 represents the input signal and the dashed line 342 represents the output. At time equals zero, the output 342 initalizes to the first signal at a value of about minus ten (−10), but then corrects toward a zero value with a time constant characteristic of the high-pass filter. At approximately twenty-one (21) seconds, the output 342 (an absolute value) drops below the minimum output, and the output 342 goes to zero. When the signal excursion begins at thirty-five (35) seconds, the output begins to climb and exactly matches the input signal except for the shift equal to the running bias. The running bias is the instantaneous difference between the input 340 and the output 342 at the moment the signal exceeds the adaptive threshold. The running bias is held fixed until the signal returns below the adaptive threshold.

It is important to note that there is substantially no signal distortion during the plateau of the input signal around forty (40) seconds. When the signal returns back below the adaptive threshold, the running bias is used to initialize the high-pass filter. There may still be some recovery needed, because of the action of the high-pass filter attenuating the signal as it begins to climb, but before the adaptive threshold has been reached. This overshoot can be further reduced by calculating the running bias at the sample point further back in time, assuming there is no history of other events. As an option, the running bias can be computed at any time point in the past, or an average of such points, for according to logic which detects the presence/absence of the previous signal history. While the ABROM logic is shown and described herein in connection with the rollover detection apparatus, it should be appreciated that alternate bias removal logic may be employed without departing from the teachings of the present invention.

The rollover detection algorithm as described herein provides enhanced functionality over a wide range of rollover events, while using a small number of sensors. The integrator 64 with intelligent drift removal and deploy logic 66 having near-rollover immunity described herein provide flexibility to ensure timely deployment on rollover events, and adequate immunity to non-rollover and near-rollover events. The performance of the rollover detection provides enhanced performance for a low-cost implementation, thus making it desirable for mass market applications, such as the automotive industry.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A rollover detection apparatus for detecting an anticipated overturn condition for a vehicle, said rollover detection apparatus comprising:

an angular rate sensor for sensing attitude rate of change of a vehicle and producing an angular rate signal indicative thereof;

a controller comprising an integrator for integrating the sensed angular rate signal and producing an attitude angle, said controller further comprising deployment logic for comparing the attitude angle and sensed angular rate with a variable threshold defining a region of deployment and a region of no deployment, wherein the deployment logic further detects the presence of a driving event which causes at least one of a large attitude rate and a large attitude angle and adjusts the variable threshold based on detecting the driving event so as to prevent deployment of a vehicle overturn condition signal; and an output for providing a vehicle overturn condition signal based on said comparison.

2. The rollover detection apparatus as defined in claim 1, wherein the driving event comprises a near-rollover event.

3. The rollover detection apparatus as defined in claim 1, wherein the variable threshold comprises a minimum deployment angle.

4. The rollover detection apparatus as defined in claim 3, wherein the minimum deployment angle is set to a minimum value and is adjusted to a larger value when the driving event is detected.

5. The rollover detection apparatus as defined in claim 1, wherein the driving event is detected as a function of the attitude angle and attitude rate.

6. The rollover detection apparatus as defined in claim 1, wherein the deployment logic compares the attitude angle and sensed attitude rate of change with a variable threshold curve.

7. The rollover detection apparatus as defined in claim 6, wherein the variable threshold curve is variable based on an amount of time elapsed during a near rollover event.

8. The rollover detection apparatus as defined in claim 1, wherein said integrator comprises an infinite impulse response integrator.

9. The rollover detection apparatus as defined in claim 1, wherein the angular rate sensor senses roll angular rate of the vehicle, and said controller determines a rollover condition of the vehicle about a longitudinal axis of the vehicle.

10. The rollover detection apparatus as defined in claim 1 further comprising bias removal logic for removing bias from the sensed angular rate signal.

11. A method for detecting an anticipated overturn condition of a vehicle, comprising the steps of:

sensing attitude rate of change of a vehicle and producing an angular rate signal indicative thereof;

integrating the sensed angular rate signal and producing an attitude angle;

comparing the attitude angle and sensed angular rate with a variable threshold defining a region of deployment and a region of no deployment;

detecting the presence of a driving event which causes at least one of a large attitude rate and a large attitude angle;

adjusting the variable threshold based on the detection of the driving event so as to prevent deployment of a vehicle overturn condition; and providing a vehicle overturn condition signal based on the comparison.

12. The method as defined in claim 11, wherein the driving event comprises a near-rollover event.

13. The method as defined in claim 11, wherein the step of adjusting the threshold comprises adjusting a minimum deployment angle.

14. The method as defined in claim 13 further comprising the step of setting the minimum deployment angle to a minimum value, and adjusting the minimum deployment angle to a larger value when the driving event is detected.

15. The method as defined in claim 11, wherein the step of detecting the presence of the driving event detects the driving event as a function of the attitude angle and the attitude rate.

16. The method as defined in claim 11, wherein the step of adjusting the variable threshold is further based on an amount of time elapsed during a near rollover event.

17. The method as defined in claim 11, wherein said step of integrating comprises performing an infinite impulse response integration.

18. The method as defined in claim 11, wherein the step of sensing the angular rate of the vehicle comprises sensing roll angular rate of the vehicle, and providing a rollover condition of the vehicle about a longitudinal axis of the vehicle.

19. The method as defined in claim 11 further comprising the step of removing bias from the sensed angular rate signal.

* * * * *